United States Patent [19]

Kanai et al.

[11] Patent Number: 4,960,734
[45] Date of Patent: Oct. 2, 1990

[54] CERAMIC COMPOSITE AND PROCESS FOR PREPARATION THEREOF

[75] Inventors: Takao Kanai; Kei Tanemoto; Hiroshi Kubo; Toyohiko Sato, all of Kawasaki, Japan

[73] Assignee: Nippon Steel Corporation, Tokyo, Japan

[21] Appl. No.: 376,909

[22] Filed: Jul. 5, 1989

Related U.S. Application Data

[63] Continuation-in-part of Ser. No. 247,263, Sep. 21, 1988, abandoned.

[30] Foreign Application Priority Data

Sep. 22, 1987 [JP] Japan ................... 62-236207
Dec. 28, 1987 [JP] Japan ................... 62-329626
May 18, 1988 [JP] Japan ................... 63-119236
Jun. 3, 1988 [JP] Japan ................... 63-135562

[51] Int. Cl.$^5$ .......................................... C04B 35/58
[52] U.S. Cl. .................................. 501/98; 501/96; 264/65; 264/66
[58] Field of Search ............... 501/96, 98; 264/65, 264/66

[56] References Cited

U.S. PATENT DOCUMENTS 3,854,967 12/1974 Reinmuth ................... 501/98
4,642,298 2/1987 Kuramoto et al. ........... 501/98 X
4,666,873 5/1987 Morris, Jr. et al. .......... 501/96

FOREIGN PATENT DOCUMENTS 0154992 9/1985 European Pat. Off. ........ 501/98
61-31360 2/1986 Japan ..................... 501/98

OTHER PUBLICATIONS

J. W. Maccawley et al., Progress in Nitrogen Ceramics, p. 111 (1983).
R. W. Nurse et al., trans. Brit. Ceram. Soc., 64(9), 416 (1965).
Electronic Ceramics, vol. 1, 17, No. 84, p. 68 (1986).
Toshikazu Sakai, Journal of the Ceramic Society of Japan, No. 86, (3) p. 125 (1978).

Primary Examiner—Karl Group
Attorney, Agent, or Firm—Wenderoth, Lind & Ponack

[57] ABSTRACT

Disclosed is a ceramic composite consisting essentially of hexagonal boron nitride (h-BN), aluminum nitride and, if any, unavoidably formed aluminum oxynitride (AlON), and a sintering aid and/or a reaction product of the sintering aid with the above-mentioned components (h-BN, AlN and AlON), in which the total amount of the sintering aid and the reaction product is 0.01 to 5 parts by weight per 100 parts by weight of the sum of h-BN, AlN and AlON. This sintered body comprises AlN and AlON in a total amount of 45 to 5% by weight with 55 to 95% by weight of h-BN. Alternatively, this sintered body comprises AlN and AlON in a total amount of 80 to 5% by weight with 20 to 95% by weight of h-BN, the degree of anisotropy of the thermal conductivity of the sintered body (the ratio of the maximum thermal conductivity to the minimum thermal conductivity, the direction of the maximum thermal conductivity being perpendicular to the direction of the minimum thermal conductivity) being at least 2.

24 Claims, 1 Drawing Sheet

CERAMIC COMPOSITE AND PROCESS FOR PREPARATION THEREOF

This application is a continuation-in-part of now abandoned application, Ser. No. 07/247,263 filed on Sept. 21, 1988 now abandoned.

BACKGROUND OF THE INVENTION (1) Field of the Invention

The present invention relates to a ceramic composite and a process for the preparation thereof. More particularly, the present invention relates to a ceramic composite composed mainly of hexagonal boron nitride and aluminum nitride, which is electrically insulating and has a high thermal conductivity, a relatively small thermal expansion coefficient, a low dielectric constant, and a good machinability. More specifically, the present invention relates to a ceramic composite which can be used as an IC package material, an IC substrate material, an electrically insulating radiating material with high thermal conductivity applicable at room temperature to a high temperature, and a machinable ceramic material.

(2) Description of the Related Art

Aluminum nitride has a high thermal conductivity of about 110 to about 195 W/m.K at room temperature, which is several times to ten times as high as the thermal conductivity of alumina. Accordingly, aluminum nitride has attracted attention as a substrate of a semiconductor device or a package material, to replace alumina, and is in practical use in this field (see, for example, Japanese Unexamined Patent Publication No. 61-270264, Japanese Unexamined Patent Publication No. 62-36069 and Japanese Unexamined Patent Publication No. 62-41766). This is because, to satisfy recent requirements for a reduction in the size of electronic devices, and to improve the performances thereof, an increase of the degree of integration, a multiplication of the functions, an increase of the operation speed, an increase of the output, and an enhancement of the reliability are being rapidly developed, with the result that the quantities of heat generated from semiconductors tend to increase correspondingly.

Nevertheless, several problems are encountered when aluminum nitride is utilized as an IC package material, an IC substrate material or an electrically insulating material. For example, although aluminum nitride has a higher thermal conductivity than alumina, and thus the problem of the heat radiating efficiency can be solved, the dielectric constant at room temperature and 1 MHz is as large as 9 to 10, and therefore, the delay of a signal in a wiring pattern formed thereon is prolonged, and accordingly, high-speed operation is hindered. Moreover, since the thermal expansion coefficient of aluminum nitride is larger than that of a single crystal of silicon, high-density packaging is difficult.

The machining of an aluminum nitride sintered body, as well as that of ordinary structural ceramics, is difficult, and the sintered body is defective in that a long time is required to machine it into a desired shape, and thus the machining cost is increased.

A hexagonal boron nitride sintered body has an excellent machinability, corrosion resistance, thermal shock resistance, and electrically insulating property, and therefore, this sintered body is used in many fields. In general, the hexagonal boron nitride ceramics is produced by the hot-press method using an oxide type assistant, and it is known that the sintered body obtained according to this method has a structural anisotropy attributable to the layered crystal structure of hexagonal boron nitride [see, for example, Bulletin of the Ceramic Society of Japan, Vol. 7, No. 4, page 243 (1972)]. This anisotropy is also found in the physical properties such as thermal conductivity, but even in a sintered body in which the anisotropy exists, the thermal conductivity is not very high, e.g., it has been reported that the thermal conductivity is only about 60 W/m.K at highest [see, for example, Electronic Ceramics, Vol. 17, No. 84, page 68 (1986)]. The reason for this is considered to be that a large amount of the oxide type sintering aids or a reaction product of the sintering aids with another component is present in the sintered body.

A sintered body composed solely of boron nitride has a relatively lower thermal conductivity than that of the aluminum nitride sintered body, but the thermal expansion coefficient of boron nitride is too low, and a good match with silicon, which semiconductor is to be actually mounted on a substrate or package, cannot be obtained. Accordingly, boron nitride is rarely utilized as an IC package material or an IC substrate material.

A sintered body formed by combining aluminum nitride with hexagonal boron nitride, mainly in an attempt to improve the machinability of the sintered body while maintaining the high thermal conductivity of the aluminum nitride sintered body, and a process for the preparation of this composite have been proposed. For example, Japanese Unexamined Patent Publication No. 60-195058 discloses a process for preparation of an aluminum nitride sintered body by adding at least one compound selected from the group of calcium nitrite, barium nitrite and strontium nitrite as a sintering aid in an amount of 0.01–5% by weight to an aluminum nitride powder or a mixed powder of aluminum nitride with boron nitride and/or silicon nitride, and Japanese Unexamined Patent Publication No. 60-195059 discloses a sintered body comprising aluminum nitride, boron nitride, and compounds of metals of the groups IIa and IIIa, in which polygonal aluminum nitride particles are filled in fracture planes and a thin layer of boron nitride is interposed in a part of, or all of the grain boundary.

It is stated that this sintered body is characterized in that it is a machinable ceramic composite which can be machined at a high speed by an ordinary tool. This sintered body is homogeneous and isotropic, and a value of 55 to 122 W/m.K has been reported as an example of the thermal conductivity thereof.

Nevertheless, although this sintered body has an excellent machinability, the thermal conductivity is 122 W/m.K at highest, and in some applications this thermal conductivity is not sufficient for an IC substrate material, an IC package material or an electrically insulating material.

Japanese Unexamined Patent Publication No. 58-32073 discloses a process in which an electrically insulating sintered body having a high thermal conductivity is prepared by incorporating up to 30% by weight of cubic or hexagonal boron nitride in a aluminum nitride, forming the mixture, and sintering the formed body in a vacuum or in a non-oxidizing atmosphere, or hot-press-sintering the formed body. This publication discloses that this sintered body has a thermal conductivity of about 85 to about 195 W/m.K, but does not disclose the anisotropy of the sintered body or the machinability of the sintered body with an ordinary tool or the like.

Furthermore, since these aluminum nitride/ boron nitride ceramic composites have a composition close to aluminum nitride, these ceramics are defective in that, like aluminum nitride, the dielectric constant is large and the thermal expansion coefficient is large.

Even in these aluminum nitride/boron nitride ceramic composites, in some certain preparation, as in the case of boron nitride which is sintered by hot-pressing, sometimes the structural anisotropy and the anisotropy of the physical properties attributed to the structural anisotropy of boron nitride are present (see Japanese Unexamined Patent Publication No. 62-56377), then the preparation process for eliminating this anisotropy and the way of the utilization of a material having a very small anisotropy has been focused and subjected for investigation.

SUMMARY OF THE INVENTION

In view of the foregoing conventional techniques, the present invention is intended to provide a novel sintered body of a boron nitride/aluminum nitride ceramic composites system satisfying all of the requirements for thermal conductivity, thermal expansion coefficient, electrically insulating property, dielectric constant, and machinability.

Therefore, one object of the present invention is to provide ceramic composites having a relatively small thermal expansion coefficient, a low dielectric constant, and an excellent machinability, while maintaining a high thermal conductivity and a high electrically insulating property.

Another object of the present invention is to provide a ceramic composite in which the thermal conductivity is greatly improved, though only in a certain plane, while maintaining an excellent machinability.

In accordance with the present invention, these objects can be realized by a ceramic composite consisting essentially of hexagonal boron nitride (h-BN), aluminum nitride (AlN), unavoidably formed aluminum oxynitride (AlON), and a sintering aid and/or a reaction product of the sintering aid with the other components (h-BN, AlN and AlON), the total amount of the sintering aid and the reaction product being 0.01 to 5 parts by weight per 100 parts by weight of the sum of h-BN, AlN and AlON, wherein the sintered body meets one of the following conditions: (i) the sintered body comprises AlN and AlON in a total amount of 40 to 5% by weight with 55 to 95% by weight of h-BN; and (ii) the sintered body comprises AlN and AlON in a total amount of 80 to 5% by weight with 20 to 95% by weight of h-BN, a degree of anisotropy of the thermal conductivity of the sintered body (the ratio of the maximum thermal conductivity to the minimum thermal conductivity, the direction of the maximum thermal conductivity being perpendicular to the direction of the minimum thermal conductivity) being at least 2.

This h-BN/AlN ceramic composite can provide two types; a first type of sintered body having a thermal conductivity of at least 40 W/m.K at room temperature, an average thermal expansion coefficient of 1.0 to 4.0×10$^{-6}$/K of from 0° to 400° C., a dielectric constant smaller than 7.5 at room temperature and 1 MHz, a porosity lower than 15%, and a flexural strength of at least 40 MPa at room temperature, and a second type of sintered body having a degree of anisotropy of the thermal conductivity of at least 2 and a thermal conductivity not lower than 150 W/m.K.

In accordance with the present invention, the following processes are provided for preparing the above-mentioned sintered body. First, a process is provided for the preparation of a ceramic composite, which comprises adding a sintering aid in an amount of up to 10 parts by weight to 100 parts by weight of a powder comprising 55 to 95 parts weight of a hexagonal boron nitride powder and 5 to 45 parts by weight of an aluminum nitride powder, and heating under pressure the mixture in an inert gas flow under conditions of 1500° to 2000° C. and 5 to 100 MPa. Second, a process is provided for the preparation of a ceramic composite, which comprises further heat-treating the sintered body obtained by the first process at a temperature of 1300° to 1500° C. or 1800° to 2000° C. in a reducing atmosphere or an inert gas flow. Third, a process is provided for the preparation of a ceramic composite, which comprises hot-pressing a mixed powder comprising 20 to 95 parts by weight of a hexagonal boron nitride powder, 80 to 5 parts by weight of an aluminum nitride powder, and 0.01 to 10 parts by weight of a sintering aid in a vacuum or in an inert gas flow under conditions of 1700° to 2200° C. and 5 to 50 MPa.

DESCRIPTION OF THE PREFERRED EMBODIMENTS

Figure 1:
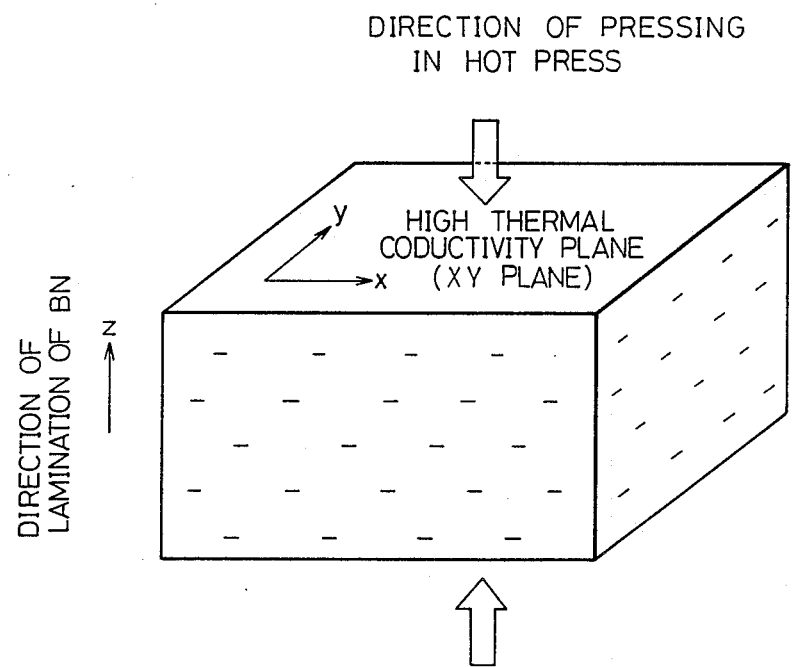
FIG. 1 is a diagrammatic perspective view showing the anisotropic h-BN/AlN ceramic composite according to the present invention.

The h-BN/AlN ceramic composites of the present invention are commonly characterized in that the sintered body consists essentially of h-BN, AlN, unavoidably formed AlON, if any, and a sintering aid and/or a reaction product of the sintering aid with the above-mentioned other components (h-BN, AlN and AlON), the total amount of the sintering aid and the reaction product thereof being 0.01 to 5 parts by weight, preferably 0.2 to 0.5 parts by weight, per 100 parts by weight of the sum of h-BN, AlN and AlON. Furthermore, the (h-BN)/(AlN+AlON) weight ratio is from 20/80 to 95/5.

Hexagonal boron nitride in the sintered body is obtained by using as the starting material a hexagonal boron nitride powder having as high a purity as possible. Boron nitride includes hexagonal boron nitride and cubic boron nitride. The hexagonal boron nitride is used because the machinability is improved thereby.

Aluminum nitride in the sintered body is obtained by using an aluminum nitride powder as the starting material.

Aluminum oxynitride is a compound formed during the sintering by reaction between aluminum nitride and an oxide component, mainly aluminum oxide formed on the surface of the aluminum nitride powder [Toshikazu Sakai, Journal of the Ceramic Society of Japan, 86 (3), 125 (1978), and J. W. Maccauley et al., Progress in Nitrogen Ceramics, page 111 (1983)], and it is known that several compound phases for aluminum oxynitride exist. Aluminum oxynitride is exactly represented by $Al_{(8/3+x/3)}O_{4-x}N_x$ but is referred to hereinafter as AlON, for convenience. These compound phases depend mainly on the temperature adopted for the production of the sintered body. In the present invention, the compound phase of aluminum oxynitride is not particularly critical, and the aluminum oxynitride may be present in an amount of 0 to 7.5% by weight based on the aluminum nitride content.

In the present invention, the aluminum oxynitride may be present in an amount of up to 7.5% by weight of the aluminum nitride, but is preferably in a less amount as possible to obtain high thermal conductivity. Particularly, the second type of the sintered body having the anisotropy particularly preferably contains the aluminum oxynitride in an amount of not more than 1% by weight of the aluminum nitride. This reduction of the amount of aluminum oxynitride in the sintered body can be realized by appropriately selecting an amount of a calcium or yttrium compound added as a sintering aid so that a complex compound of $CaAl_{12}O_{19}$, $CaAl_4O_7$, $CaAl_2O_4$ etc., when the calcium compound is added, and $Y_3Al_5O_{12}$, $YAlO_3$, $Y_4Al_2O_9$, etc., when the yttrium compound is added, is formed and the aluminum oxynitride is disappeared in the sintered body. The appropriate amount of the sintering aid to be added depends on the amount of oxide formed on the surface of the starting materials. Selection of the amount of the sintering aid to be added should be carefully done since the thermal conductivity of the sintered body is sensitive to the amount of the added sintering aid, as described below.

As typical instances of the sintering aid used in the present invention, there can be mentioned calcium compounds such as calcium oxide, calcium carbide, calcium carbonate, calcium nitrate, calcium fluoride, calcium hydroxide, calcium cyanide, and calcium cyanamide, and yttrium compounds such as yttrium oxide, yttrium carbide, yttrium fluoride, and yttrium nitrate. Boron oxide can be used in combination with these sintering aids.

The reaction product of the sintering aid with other components (h-BN, AlN and AlON) consists mainly of calcium aluminate or yttrium aluminate. Calcium aluminate and yttrium aluminate are a compound composed of calcium oxide and aluminum oxide and a compound composed of yttrium oxide and aluminum oxide, respectively, and it is known that several compounds can be formed by varying the mixing ratio of the two components [R. W. Nurse et al., Trans. Brit. Ceram. Soc. 64(9), 416 (1965) and T. Noguchi et al., Kogyo Kagaku Zasshi, 70(6), 839 (1967)]. In the present invention, the kind of calcium aluminate or yttrium aluminate is not particularly critical. As other compound, there can be mentioned calcium boride, calcium borate, and yttrium borate, but substantially, there is no possibility of a formation of calcium borate and yttrium borate.

Where anhydrous boron oxide ($B_2O_3$) is used as the sintering aid, since this compound is substantially vaporized and most of the remaining $B_2O_3$ is converted to boron nitride, during the sintering, boron oxide is not substantially present in the sintered body.

In the sintered body of the present invention, the sintering aid and the reaction product thereof are present in an amount of 0.01 to 5 parts by weight, preferably 0.2 to 5 parts by weight, per 100 parts by weight of the sum of h-BN, AlN, and AlON. If the amount of the sintering aid is smaller than 0.01 part by weight, a sintered body having the intended characteristics cannot be obtained. Of the sintering aids, as mentioned above, $B_2O_3$ used in a particular case is not substantially present in the sintered body. Accordingly, the calcium compound or yttrium compound and the reaction product thereof are mainly present in the sintered body, but if the amount exceeds 5 parts by weight, a decrease of the thermal conductivity occurs.

The first type of the ceramic composite provided according to the present invention is a sintered body comprising 45 to 5% by weight of AlN and AlON (if present) with 55 to 95% by weight of h-BN, and further comprising 0.01 to 5 parts by weight, preferably 0.5 to 2 parts by wight of the sintering aid and/or the reaction product thereof per 100 parts by weight of the sum of h-BN, AlN and AlON.

With the composition in which the amount of h-BN is close to 55% by weight, a sintered body can be obtained in which the thermal conductivity is high, the mechanical strength is relatively high, and the thermal expansion coefficient and dielectric constant are relatively large. In contrast, with the composition in which the amount of h-BN is 95% by weight, a sintered body can be obtained that has a relatively small thermal expansion coefficient and a relatively low dielectric constant, although the thermal conductivity and the mechanical strength are not high. If the amount of h-BN is outside the above-mentioned range, a satisfactory sintered body cannot be obtained. For example, the thermal expansion coefficient and the dielectric constant are too large in a sintered body having an h-BN content lower than 55% by weight, and in a sintered body having an h-BN content higher than 95% by weight, the thermal conductivity and the mechanical strength are low. With a composition in which the amount of h-BN is 55% by weight or more, the dielectric constant becomes 7 or more and the delay of the signal calculated by $T_{pd}\sqrt{\epsilon}/c$ (c: velocity of light) becomes 9 ns/m or less. This speed is as high as the best of ceramics, and therefore, the above composition allows a high speed signal transmission. By increasing the proportion of h-BN, it was found that the machinability of the sintered body is distinctively increased in an amount of 55 to 60% by weight of h-BN. A sintered body having 55% by weight of h-BN was found to have twice as large a grinding ratio (amount-of-removal-of-work/ amount-of-abrasion-of-diamond-adhesive) as that of a sintered body having 40% by weight of h-BN. A sintered body comprising 55 to 95% by weight, especially 60 to 90% by weight, of h-BN, and 45 to 5% by weight, especially 40 to 10% by weight, of AlN and AlON is preferred.

The sintering aid, especially the above-mentioned calcium compound or yttrium compound, promotes densification because it forms a liquid phase, and to reduce the amount of oxygen in aluminum nitride particles and increase the thermal conductivity, the sintering aid should be contained in an amount of at least 0.01 part by weight, preferably at least 0.2 part by weight. Incorporation of the sintering aid in an amount exceeding 5 parts by weight is not preferred because a decrease of the thermal conductivity occurs.

This ceramic composite is characterized in that the thermal conductivity at room temperature is at least 40 W/m.K, the average thermal expansion coefficient of from 0° to 400° C. is controlled to 1.0 to $4.0 \times 10^{-6}$/K, and the dielectric constant at room temperature and 1 MHz is smaller than 7.5.

This sintered body is also characterized in that the porosity is lower than 15% and the flexural strength at room temperature is at least 40 MPa.

In view of the utilization thereof for an IC package material, an IC substrate material, and an electrically insulating material, preferably the thermal conductivity at room temperature is at least 40 W/m.K. This value can be attained by a promotion of the densification and a reduction of the amount of oxygen contained in nitride particles by the sintering aid such as the calcium compound or yttrium compound in the composite sintered body.

The average thermal coefficient of from 0° to 400° C. is influenced by the kind, amount, and presence of the sintering aid and the reaction products of the sintering aid with the other components, but is mainly determined by the content of h-BN. For example, this average thermal expansion coefficient is about $4.0 \times 10^{-6}/K$ in a sintered body containing 40 parts by weight of h-BN, and is about $1.0 \times 10^{-6}/K$ in a sintered body containing 95 parts by weight of h-BN. By controlling the h-BN/AlN content ratio and the sintering conditions, the thermal expansion coefficient can be brought close to that of Si, i.e., $3.6 \times 10^{-6}/K$, and the thermal expansion coefficient of the sintered body having the above-mentioned composition (55 to 95% by weight of h-BN) is in the range of 1.0 to $4.0 \times 10^{-6}/K$. A composition comprising 75 to 55% by weight of h-BN and 25 to 45% by weight of AlN and AlON is preferred, as it brings the thermal expansion coefficient close to that of Si.

In view of the high-frequency characteristics, preferably the dielectric constant at room temperature and 1 MHz is smaller than 7.5. If the porosity exceeds 15% and the mechanical strength is lower than 40 MPa, the basic mechanical properties of the sintered body as the material are poor and it is difficult to utilize the sintered body for electronic parts.

The ceramic composite having the above-mentioned composition and characteristics is prepared, for example, by a process described below. Note, this process is a preferred embodiment of the preparation process, and the preparation process is not limited to this process.

More specifically, up to 10 parts by weight of the sintering aid is added to 100 parts by weight of a powder comprising 40 (not inclusive) to 95 parts by weight of an h-BN powder and 5 to 60 parts by weight of an AlN powder, and the mixture is heated under pressure at a temperature of 1500° to 2000° C. under a pressure of 5 to 100 MPa in an inert gas flow.

At least one member selected from calcium compounds and yttrium compounds is added as the sintering aid in an amount of up to 5 parts by weight, preferably 0.2 to 5 parts by weight.

The kind of the calcium compound is not particularly critical, for example, calcium oxide, calcium carbide, calcium carbonate, calcium nitrate, calcium fluoride, calcium hydroxide, calcium cyanide, and calcium cyanamide can be used, but calcium oxide and calcium carbide are especially preferred.

The kind of the yttrium compound is not particularly critical, for example, yttrium oxide, yttrium carbide, yttrium fluoride, and yttrium nitrate can be used, but yttrium oxide and yttrium carbide are especially preferred.

If necessary, especially when the content of h-BN is 80 to 95% by weight, preferably anhydrous boron oxide is added in an amount of up to 5 parts by weight, since the densification is conspicuously promoted by this addition of anhydrous boron oxide. Boron oxide forms a liquid phase at a temperature as low as several hundred °C. and the majority of boron oxide volatilizes at a temperature of up to 1500° C., and moreover, the majority of the residual boron oxide is converted to boron nitride by heating in nitrogen gas flow. Accordingly, where boron oxide is used in combination with the sintering aid, preferably the heating is carried out in a nitrogen gas flow, since if the heating is carried out in a nitrogen gas flow, no crystal phase other than h-BN, AlN, and aluminate phases substantially remains in the sintered body.

The reasons for the limitation of the temperature at the heating under pressure step to 1500° to 2000° C. are as follows: Where the temperature is lower than 1500° C., even if the above-mentioned calcium compound or yttrium compound is added, a sintered body having a desired porosity and thermal conductivity cannot be obtained, and if the temperature exceeds 2000° C., the process becomes economically disadvantageous. The reasons for the limitation of the pressure to 5 to 100 MPa are as follows: If the pressure is lower than 5 MPa, a sintered body having a desired porosity cannot be obtained, and if the pressure exceeds 100 MPa, the mold that can be used is restricted, for example, in the hot-pressing method.

As the compressing method, either a uniaxial compression such as hot-pressing or an isostatic compression such as HIP can be adopted. In the case of an isostatic compression, many open pores are present in the green body, and preliminary sintering to remove the pores or a preliminary treatment such as encapsulation is necessary.

Preferably, the heating under pressure is conducted for 0.5 to 4 hours, especially 1 to 2 hours. If the heating under pressure time is shorter than 0.5 hour, sometimes the densification of the sintered body is unsatisfactory, and thus satisfactory characteristic values cannot be obtained, and if the heating under pressure is conducted for more than 4 hours, the characteristic values are not adversely influenced but the process becomes economically disadvantageous.

To prevent oxidation of the nitride particles, preferably the heating under pressure is conducted in a flow of an inert gas such as nitrogen or argon.

If the sintered body obtained by this heating under pressure is further heat-treated in an inert gas flow at 1300° to 1500° C. or 1800° to 2000° C., the thermal conductivity in particular is improved.

If the heat treatment is conducted at 1300° to 1500° C., the solidification product of the liquid phase present mainly in the grain boundary migrates to the triple points of the grain boundary, and if the heat treatment is conducted at 1800° to 2000° C., the content of the oxygen impurity contained in the nitride particles is reduced and the number of grain boundaries decreased by the growth of the particles. The heat treatment temperature is limited to the above-mentioned range because, if the treatment temperature is lower than 1300° C., no effect is obtained because the temperature is too low, and if the treatment temperature is higher than 1500° C. and lower than 1800° C., the bulk density is reduced by a volatilization of a part of the liquid phase and the thermal conductivity is decreased because the reduction of the oxygen impurity and decrease of the number of grain boundaries by the growth of the particles does not occur, since the temperature is too low. If the treatment temperature exceeds 2000° C., the treatment becomes economically disadvantageous due to this excessive heating, and since the treatment temperature exceeds the sintering temperature, there is a risk of a change in the sintered body per se.

Where the heat treatment is conducted at 1300° to 1500° C., a treatment time of 0.5 to 2 hours is preferred. If the treatment time is shorter than 0.5 hour, a satisfactory effect cannot be obtained, and a treatment time exceeding 2 hours is not preferred from the economical viewpoint. Where the heat treatment is conducted at 1800° to 2000° C., since the intended effect cannot be obtained if the treatment time is short, the heat treatment must be conducted for at least 2 hours.

To prevent oxidation during the heat treatment, preferably the heat treatment is conducted in a flow of an inert gas such as nitrogen or argon or in a reducing atmosphere. An especially high effect can be obtained if the heat treatment is carried out at 1800° to 2000° C. in a reducing atmosphere. The reducing atmosphere can be obtained, for example, by introducing a hydrogen gas, filling with a graphite powder, or sealing in a graphite vessel.

The second type of the ceramic composite provided according to the present invention is a sintered body comprising 80 to 5% by weight of the total amount of AlN, and AlON if present, with 20 to 95% by weight of h-BN, and further comprising 0.01 to 5 parts by weight, preferably 0.2 to 5 parts by weight of a sintering aid and/or a reaction product thereof with the other components per 100 parts by weight of the sum of h-BN, AlN and AlON, wherein the degree of anisotropy of the thermal conductivity of the sintered body (the ratio of the maximum thermal conductivity to the minimum thermal conductivity, the direction of the maximum thermal conductivity being perpendicular to the direction of the minimum thermal conductivity) is at least 2.

Where the composition has a content of h-BN close to 20% by weight based on the sum of h-BN, AlN and AlON, a sintered body can be obtained in which the flexural strength and Vickers hardness are relatively high, the thermal expansion coefficient is relatively large, and the anisotropy is relatively small. Conversely, where the composition has an amount of h-BN close to 95% by weight, a sintered body can be obtained in which the anisotropy is conspicuous, the thermal expansion is relatively small in a two-dimensional plane, and the machinability is very good. If the composition is outside this range and the content of h-BN is lower than 20% by weight, the anisotropy of the sintered body is not conspicuous and the thermal conductivity is substantially equal to that of the AlN sintered body, and therefore, since the sintered body is composed substantially solely of AlN, the machinability of the obtained sintered body is reduced. In a sintered body having an h-BN content exceeding 95% by weight, the flexural strength and the thermal conductivity are low. Preferably, the content of h-BN is 20 to 80% by weight, especially 25 to 75% by weight, based on the sum of h-BN, AlN and AlON.

This sintered body having an anisotropy has a structure in which boron nitride particles are oriented and laminated in the form of thin scales in the direction of the z axis, as shown in the diagram of FIG. 1, and accordingly, the anisotropy of the physical property values such as the thermal conductivity is produced. By the degree of anisotropy is meant the ratio of the thermal conductivity in an optional direction on the plane (x-y plane) including the x axis and y axis (the maximum thermal conductivity) and the thermal conductivity in the direction of the z axis (the maximum thermal conductivity), i.e., the ratio of the thermal conductivity in an optional direction on the x-y plane/the thermal conductivity in the direction of the z axis. If the hot-pressing axis is set in the direction of the z axis, a lamination of BN occurs in the direction of the z axis and the thermal conductivity is poor in this direction. On the other hand, in the x axis and y axis and the plane including both axes, the sintered body shows a high thermal conductivity. In the sintered body of the present invention, there exists an anisotropy of the values of physical properties other than the thermal conductivity, such as the thermal expansion coefficient and Vickers hardness, but in the instant specification and appended claims, reference to the degree of anisotropy denotes only the anisotropy of the thermal conductivity.

This sintered body has a degree of anisotropy of at least 2, and the value of the higher thermal conductivity (the thermal conductivity in an optional direction on the x-y plane including the x axis and y axis) is at least 100 W/m.K, preferably at least 150 W/m.K. The composition satisfying this requirement comprises 20 to 95% by weight of h-BN, preferably 20 to 80% by weight of h-BN, of the sum of h-BN, AlN, and AlON. Although this anisotropy is observed in a sintered body composed solely of h-BN, the thermal conductivity is not very high, i.e., about 60 W/m.K, at highest. A thermal conductivity of at least 100 W/m.K, preferably at least 150 W/m.K, is obtained for the first time by an incorporation of at least 5% by weight, preferably 20 to 80% by weight, of AlN (and AlON).

The grain size constituting the sintered body, especially the grain size of h-BN, has a great influence on the anisotropy of the sintered body. The average grain size of h-BN constituting this sintered body is at least 1 $\mu$m, preferably 5 $\mu$m to 30 $\mu$m. Changes of the thermal conductivity caused by changing the composition of the sintered body composed of h-BN grains having an average grain size of at least 1 $\mu$m will be described in detail in the examples given hereinafter. When the AlN content is increased, the thermal conductivity is highest at an h-BN content of about 75 to 50%. If the AlN content is further increased, the value of the high thermal conductivity gradually decreases and becomes close to the value of the sintered body of AlN.

Changes of the lower thermal conductivity, i.e., the thermal conductivity in the direction of the z axis in FIG. 1, are such that the thermal conductivity is almost constant when the content of boron nitride is up to 50% by weight, but if the AlN content exceeds 50% by weight, the value of the thermal conductivity gradually increases and becomes close to the value of the sintered body of AlN, and the anisotropy is usually lost.

The change of the thermal conductivity will now be examined with respect to the anisotropy. The degree of anisotropy is largest in a composition comprising about 75 to about 50% by weight of boron nitride, and the value is at least 10 in many cases and as large as about 15 in an extreme case. If the h-BN content is about 50% by weight and higher, an increase of the content of AlN and AlON results in a gradual decrease of the degree of anisotropy, and the degree of anisotropy is about 2 when the h-BN content is about 20% by weight and the content of AlN and AlON is about 80% by weight.

The degree of anisotropy of the sintered body composed of h-BN grains having an average grain size smaller than 1 $\mu$m will now be described. The degree of anisotropy of the sintered body composed of h-BN grains having an average grain size of about 0.1 $\mu$m is small and about 1/5 to about 1/10 of the degree of anisotropy of the sintered body according to the present invention. Accordingly, in a specific composition, the degree of anisotropy is at least 2 and the higher thermal conductivity is at least 100 W/m.K, preferably at least 150 W/m.K. In case of the sintered body composed of h-BN grains having a grain size of about 0.01 μm, the degree of anisotropy is almost equal to 1, and the change of the thermal conductivity according to the composition is such that the thermal conductivity tends to monotonously increase with an increase of the content of AlN (and AlON). More specifically, in the anisotropic sintered body according to the present invention, if the average grain size of h-BN grains constituting the sintered body is at least 1 μm, a desired thermal conductivity and a desired degree of anisotropy can be easily obtained where a composition has an h-BN content of 20 to 95% by weight, preferably 20 to 80% by weight. By the grain size of h-BN grains referred to herein is meant the size in the plane direction of thin scaly boron nitride grains, and the size of the thickness direction is excluded therefrom.

In this sintered body, preferably the sintering aid and the reaction product of the sintering aid with other components are present in an amount of 0.01 to 5 parts by weight, preferably 0.2 to 5 parts by weight, per 100 parts by weight of the sum of h-BN, AlN and AlON. The thermal conductivity, especially the higher thermal conductivity, of this sintered body is very sensitive to the amount of sintering aid added, and the optimum amount of sintering aid added depends mainly on the surface condition of the starting powder, especially the amount of the oxide formed on the surface.

The most preferred process for the preparation of this h-BN/AlN type sintered body will now be described. According to this process, a mixed powder comprising 20 to 95 parts by weight of h-BN, 80 to 5 parts by weight of AlN and 0.01 to 10 parts by weight of the sintered aid is hot-pressed at 1700° to 2200° C. and 5 to 50 MPa in an inert gas flow.

A known AlN powder can be used as the starting AlN powder, but to obtain a high thermal conductivity, preferably an AlN powder having an average particle size smaller than 5 μm, preferably smaller than 2 μm and an oxygen content lower than 3.0% by weight, especially lower than 1.5% by weight, is used.

A known h-BN powder can be used as the starting h-BN powder, but if a powder having an average particle size larger than 1 μm, preferably larger than 5 μm, is used, a desired sintered body is advantageously prepared and use of this powder is especially preferred. Nevertheless, even when a starting powder has an average particle size smaller than 1 μm, an intended sintered body can be prepared by adjusting and controlling the sintering aid and the hot-press conditions. Preferably, the purity of the used h-BN starting powder is as high as possible.

As mentioned above, known sintering aids such as calcium oxide, calcium carbide, calcium cyanamide, yttrium oxide, and yttrium carbide can be used, and at least one compound selected from these compounds is added in an amount of 0.01 to 5% by weight, preferably 0.2 to 5% by weight, based on the sum of h-BN and AlN. If the amount of the sintering aid is smaller than 0.01% by weight, the function as a sintering aid is not satisfactory, and if the amount of the sintering aid exceeds 5% by weight, the amount of the sintering aid left in the sintered body or the reaction product of the sintering aid with other components becomes excessive, resulting in a reduction of the thermal conductivity. As mentioned above, the thermal conductivity, especially the higher thermal conductivity, of the sintered body is sensitive to the amount of sintering aid added, and the amount of sintering aid to be added should be carefully determined. Furthermore, since the optimum amount of sintering aid added depends on the surface condition of the starting powder, especially the amount of the oxide formed on the surface, the optimum amount of sintering aid added may differ according to the kind of starting powder.

In this process for the preparation of the sintered body, if necessary, especially when 80 to 95 parts by weight of the starting h-BN powder and 20 to 5 parts by weight of the starting AlN powder are used, the densification can be further increased by adding up to 5 parts by weight of boron oxide in addition to 0.01 to 5 parts by weight of the above-mentioned calcium compound or yttrium compound.

The starting material can be mixed with the sintering aid by a known dry or wet mixing method using a ball mill or the like, but preferably the wet mixing method is used. The kind of dispersing medium used for the wet mixing is not particularly critical, but preferably alcohols, hydrocarbons and ketones are used. Water is not preferred, except in special cases, because water may cause a formation of ammonia gas by reaction with the nitride powder.

The hot-press method, which is a uniaxial compression method, is adopted for the sintering when obtaining the sintered body of the present invention. If a pressureless sintering or isotropic sintering such as HIP is carried out after the forming, orientation or lamination of h-BN particles does not occur or is unsatisfactory, and accordingly, this sintering method is not preferable. In the hot-press sintering, the obtained powder mixture is directly charged in a graphite die, or the obtained powder is uniaxially molded under a pressure of up to about 20 MPa and the green body is charged in a die so that the compression axis of the uniaxial molding is in agreement with the compression axis of the hot press. If the mixed powder is formed under a hydrostatic pressure by a high-pressure press (for example, 2 ton/cm$^2$), the molded body is charged in a die, and the hot-press sintering is carried out, whereby the anisotropy of the sintered body is reduced and a more isotropic sintered body is obtained (see, for example, Japanese Unexamined Patent Publication No. 62-56377).

The hot-press sintering is carried out under a temperature of 1700° to 2200° C. and a pressure of 5 to 50 MPa. If the temperature is lower than 1700° C., a sintered body having the desired physical properties, especially a high thermal conductivity, cannot be obtained, and a sintering temperature higher than 2200° C. is not preferable from the economical viewpoint. If the compression pressure is lower than 5 MPa, the densification of the sintered body or the orientation of h-BN particles is often unsatisfactory, and if the compression pressure is higher than 50 MPa, the kind of the die that can be used for the hot-press sintering is restricted. To prevent oxidation of the nitride, an inert gas flow such as nitrogen gas is preferably used as the sintering atmosphere. Where a specific sintering aid is used, if the sintering is carried out in a vacuum, the sintering aid or the reaction product of the sintering aid with other components is promptly vaporized from the sintering system and the thermal conductivity is improved. Accordingly, the sintering is preferably carried out in a vacuum.

The anisotropy of the sintered body caused by orientation and lamination of h-BN particles and the high thermal conductivity produced by this anisotropy can be obtained by the above-mentioned process. More specifically, calcium oxide, calcium carbide or calcium cyanamide added as the sintering aid at the hot-press sintering step reacts with aluminum oxide unavoidably formed on the surface of aluminum nitride to form a calcium-aluminum oxide, and this oxide begins to melt at about 1400° C. When yttrium oxide or yttrium carbide is added, this compound reacts with aluminum oxide to form an aluminum-yttrium oxide, which begins to melt at a temperature higher than 1700° C.

This melt gradually surrounds h-BN and AlN or AlON and reacts substantially completely with the oxide layer on the surfaces of the nitride particles, to purify the surfaces of the particles and improve the thermal conductivity of the sintered body. Also, due to the melt, the densification of the particles is advanced by liquid-phase sintering, through such processes as (1) re-arrangement, (2) dissolution-deposition, and (3) grain growth. This densification mechanism participated in by the liquid phase promotes the orientation-lamination of h-BN by the uniaxial compression, and causes the boron nitride particles to be laminated substantially completely in the direction parallel to the compression axis of the hot pressing, whereby a sintered body having an anisotropy is obtained.

This h-BN/AlN sintered body having an anisotropy can be easily machined and processed, regardless of the composition, so long as the boron nitride content is 20 to 95% by weight.

The present invention will now be described in detail with reference to the following examples, that by no means limit the scope of the invention.

EXAMPLE 1

A hexagonal boron nitride powder (average particle size of 0.2 μm) and an aluminum nitride powder (average particle size of 1.8 μm) were weighed in amounts shown in Table 1, a sintering aid shown in Table 1 was added, and wet mixing was carried out for 24 hours in a ball mill using acetone as the solvent.

The resultant powder was dried and hot-press sintering was carried out at 1800° C. under a pressure of 40 MPa for 2 hours in a nitrogen gas flow of 2 l/min, using a graphite vessel having an inner diameter of 90 mm. The crystal phase of the obtained sintered body was determined, and the thermal conductivity at room temperature, the average thermal expansion coefficient of from 0° to 400° C., the electric resistance at room temperature, the dielectric constant at room temperature and 1 MHz, the porosity, and the flexural strength at room temperature thereof were measured. The results are shown in Table 1.

The crystal phase was determined by the X-ray diffraction with internal standard using aluminum oxide (corundum) as the reference material. The thermal conductivity was measured by the laser flash method, and the thermal expansion coefficient was measured by the differential method using aluminum oxide as the standard with respect to the direction perpendicular to the compression axis of the hot press. The flexural strength was measured by the three-point bending strength method of the JIS Standards, where the span was taken in the direction perpendicular to the compression axis of the hot press.

From the results shown in Table 1, it can be seen that, in all of the compositions of from Sample 1 having a highest boron nitride content to Sample 13 having a lowest boron nitride content, a thermal conductivity at room temperature of at least 40 W/m.K, an average thermal expansion coefficient of 1.0 to $4.0 \times 10^{-6}$/K of 0° to 400° C., a dielectric constant smaller than 7.5 at room temperature and 1 MHz, and a flexural strength at room temperature of at least 40 MPa, were obtained.

TABLE 1

| | | | | | | | Characteristics of Ceramic Composites | | | | |
|---|---|---|---|---|---|---|---|---|---|---|---|
| Sample No. | Mixing ratio (parts by weight) | | Sintering aid (parts by weight) | | Crystal phase of sintered body (parts by weight) | | Thermal conductivity (W/m · K) | Thermal Expansion Coefficient ($\times 10^{-6}$/K) | Electric resistance (Ω · cm) | Dielectric constant [1 MHz] | Porosity (%) | Flexural strength (MPa) |
| 1 | h-BN | 95 | $B_2O_3$ | 1.5 | h-BN (hexagonal) | 94.6 | 41 | 1.1 | $9.1 \times 10^{13}$ | 4.49 | 7.4 | 51 |
| | AlN | 5 | CaO | 1.0 | AlN | 4.6 | | | | | | |
| | | | | | $C_3A_5^1$ | 0.8 | | | | | | |
| 2 | h-BN | 90 | $B_2O_3$ | 1.0 | h-BN (hexagonal) | 90.3 | 47 | 1.8 | $7.4 \times 10^{13}$ | 4.79 | 5.1 | 63 |
| | AlN | 10 | $CaC_2$ | 1.0 | AlN | 8.8 | | | | | | |
| | | | | | $CA_2^2$ | 0.9 | | | | | | |
| 3 | h-BN | 80 | $YC_2$ | 0.8 | h-BN (hexagonal) | 79.1 | 75 | 2.7 | $7.7 \times 10^{13}$ | 5.81 | 1.9 | 106 |
| | AlN | 20 | | | AlN | 18.5 | | | | | | |
| | | | | | $YAG^3$ | 1.4 | | | | | | |
| | | | | | $AlON^4$ | 1.0 | | | | | | |
| 4 | h-BN | 75 | $CaC_2$ | 0.1 | h-BN (hexagonal) | 74.7 | 70 | 3.2 | $8.3 \times 10^{13}$ | 6.37 | 1.6 | 144 |
| | AlN | 25 | | | AlN | 20.8 | | | | | | |
| | | | | | $AlON^4$ | 3.9 | | | | | | |
| | | | | | $CA_2^2$ | 0.6 | | | | | | |
| 5 | h-BN | 75 | $CaC_2$ | 0.6 | h-BN (hexagonal) | 74.9 | 85 | 3.3 | $6.7 \times 10^{13}$ | 6.48 | 1.5 | 148 |
| | AlN | 25 | | | AlN | 21.1 | | | | | | |
| | | | | | $AlON^4$ | 3.0 | | | | | | |
| | | | | | $CA_2^2$ | 1.0 | | | | | | |
| 6 | h-BN | 75 | $CaC_2$ | 1.0 | h-BN (hexagonal) | 75.4 | 143 | 3.3 | $9.6 \times 10^{13}$ | 6.51 | 1.4 | 155 |
| | AlN | 25 | | | AlN | 23.2 | | | | | | |
| | | | | | $CA^5$ | 1.4 | | | | | | |
| 7 | h-BN | 75 | $CaC_2$ | 1.5 | h-BN (hexagonal) | 75.0 | 79 | 3.4 | $8.4 \times 10^{13}$ | 6.44 | 1.4 | 153 |
| | AlN | 25 | | | AlN | 22.9 | | | | | | |
| | | | | | $CA^5$ | 2.1 | | | | | | |
| 8 | h-BN | 75 | $CaC_2$ | 4.0 | h-BN (hexagonal) | 73.7 | 67 | 3.4 | $8.8 \times 10^{13}$ | 6.45 | 1.5 | 161 |
| | AlN | 25 | | | AlN | 21.9 | | | | | | |
| | | | | | $CA^5$ | 2.4 | | | | | | |
| | | | | | $CaCN_2$ | 2.0 | | | | | | |
| 9 | h-BN | 75 | $CaCN_2$ | 1.0 | h-BN (hexagonal) | 75.0 | 122 | 3.2 | $>10^{14}$ | 6.50 | 1.3 | 159 |
| | AlN | 25 | | | AlN | 23.6 | | | | | | |
| | | | | | $CA^5$ | 1.4 | | | | | | |
| 10 | h-BN | 75 | $Y_2O_3$ | 1.0 | h-BN (hexagonal) | 74.2 | 85 | 3.2 | $6.6 \times 10^{13}$ | 6.33 | 1.2 | 163 |

TABLE 1-continued

| Sample No. | Mixing ratio (parts by weight) | | Sintering aid (parts by weight) | Crystal phase of sintered body (parts by weight) | | Thermal conductivity (W/m·K) | Thermal Expansion Coefficient (× 10⁻⁶/K) | Electric resistance (Ω·cm) | Dielectric constant [1 MHz] | Porosity (%) | Flexural strength (MPa) |
|---|---|---|---|---|---|---|---|---|---|---|---|
|  | AlN | 25 |  | AlN | 23.9 |  |  |  |  |  |  |
|  |  |  |  | YAG³ | 1.9 |  |  |  |  |  |  |
| 11 | h-BN | 60 | Y₂O₃ 1.5 | h-BN (hexagonal) | 59.8 | 90 | 3.5 | >10¹⁴ | 7.01 | 1.3 | 183 |
|  | AlN | 40 |  | AlN | 37.8 |  |  |  |  |  |  |
|  |  |  |  | YAG³ | 2.4 |  |  |  |  |  |  |

$^1$C$_3$A$_5$ = 3CaO.5Al$_2$O$_3$
$^2$CA$_2$ = CaO.2Al$_2$O$_3$
$^3$YAG = 3Y$_2$O$_3$.5Al$_2$O$_3$
$^4$AlON = Al$_{(8/3+x/3)}$O$_{4-x}$N$_x$
$^5$CA = CaO.Al$_2$O$_3$

EXAMPLE 2 (COMPARISON)

The powders used in Example 1 were weighed so that the amount of boron nitride was 99 parts by weight and the amount of aluminum nitride was 1 part by weight, 1 part by weight of boron oxide and 1 part by weight of calcium oxide were added as the sintering aid, and the mixing and hot-press sintering were carried out under the same conditions as described in Example 1. The thermal conductivity of the obtained sintered body was as low as 15 W/m.K, and the flexural strength was very low at 20 MPa.

EXAMPLE 3 (COMPARISON)

To 100 parts by weight of the aluminum nitride powder described in Example 1 was added 5 parts by weight of yttrium oxide, and hot-press sintering was carried out at 1900° C. under a pressure of 40 MPa for 2 hours. The thermal conductivity of the obtained sintered body was high and 150 W/m.K, but the thermal expansion coefficient was as large as 4.6×10⁻⁶/K and the dielectric constant was as large as 8.91.

EXAMPLE 4

The sintered body (sample 5) formed by adding 0.5 part by weight of calcium carbide to 75 parts by weight of boron nitride and 25 parts by weight of aluminum nitride, as obtained in Example 1, was heat-treated at 1480° C. for 1 hour in a nitrogen gas flow. The crystal phase, dielectric constant, porosity, and flexural strength of the sintered body were substantially the same as those of the starting sintered body, but the thermal conductivity was increased to 95 W/m.K and the thermal expansion coefficient was smaller at 3.2×10⁻⁶/K.

EXAMPLE 5

A hexagonal boron nitride powder having an average particle size of 6 μm, and aluminum nitride powder having an average particle size of 1.8 μm, and calcium carbide were mixed at a ratio shown in Table 2, and wet mixing was carried out for 24 hours in a ball mill using acetone as the solvent.

The resultant powder was dried and filled in a graphite die, and hot-press sintering was carried out at 1800° C. under a pressure of 40 MPa for 2 hours in a nitrogen gas flow of 2 l/min. The cooling rate was adjusted to 10° C./min.

The bulk density, thermal conductivity, thermal expansion coefficient, flexural strength, Vickers hardness, specific dielectric constant and electric resistance of the obtained sintered body were measured, and since an anisotropy existed in the sintered body, the thermal conductivity, thermal expansion coefficient, flexural strength, and Vickers hardness were determined with respect to either the directions perpendicular or parallel to the compression axis of the hot pressing. The bulk density was measured according to the Archimedes method, using water, the thermal conductivity was measured by the laser flash method, the Vickers hardness was measured under a load of 1 to 5 kg, the average thermal expansion coefficient was determined in the range of from 0° to 400° C. according to the differential method using an aluminum oxide (corundum) sintered body as the reference material, and the strength was determined according to the three-point bending strength method of the JIS Standards.

The results are shown in Table 2. A degree of anisotropy as prominent as 2.1 to 13.6 was observed when the boron nitride content was 95 to 20% by weight, and in each composition, the higher thermal conductivity was at least 100 W/m.K. There was a tendency for the degree of anisotropy of the thermal expansion coefficient to be decreased with a decrease of the boron nitride content. The flexural strength tended to increase with a decrease of the boron nitride content in both the directions perpendicular and parallel to the compression axis of the hot press. The ratio of both values was substantially constant at about 2 in all of the compositions except an example of the composition of 90 parts of h-BN by weight and 10 parts of AlN by weight. The Vickers hardness increased with a decrease of the boron nitride content, and the Vickers hardness abruptly increased when a boron nitride content reaches a boundary of about 50%, and the anisotropy was gradually decreased.

As seen from the results obtained when the amount added of CaC₂ was changed in the composition comprising 50% by weight of boron nitride, the thermal conductivity, especially the higher thermal conductivity, was very sensitive to the amount added of CaC₂. Note, the oxygen contents in the starting boron nitride powder and aluminum nitride powder used in this example were 0.13% by weight and 0.9% by weight, respectively.

EXAMPLE 6

The hot-press sintering was carried out in the same manner as described in Example 5, except that a powder having an average particle size of 10 μm was used as the starting h-BN powder and yttrium oxide was added as the sintered aid. The physical properties of the obtained sintered body are shown in Table 2. In each composition, results similar to those shown in Example 5 were obtained. The higher thermal conductivity was at least 150 W/m.K and the anisotropy was 2.1 to 14.2 in each composition.

TABLE 2

Characteristics of Sintered Bodies

| Ex. | BN (parts by weight) | AlN (parts by weight) | Sintering aid (parts by weight) | | Bulk density (g/cm³) | Thermal conductivity (W/m·k) | | | Thermal expansion coefficient (×10⁻⁶/k) | | Flexural strength (MPa) | | Vickers hardness (kgf/mm²) | | Specific dielectric constant [1 MHz] | Dielectric loss (×10⁻⁴) [1 MHz] | Electric resistance (Ω·cm) |
|---|---|---|---|---|---|---|---|---|---|---|---|---|---|---|---|---|---|
| | | | | | | Perpendicular to HP axis | Parallel to HP axis | Degree of anisotropy | Perpendicular to HP axis | Parallel to HP axis | Perpendicular to HP axis | Parallel to HP axis | Perpendicular to HP axis | Parallel to HP axis | | | |
| Ex. 5 | 90 | 10 | CaC₂ | 0.5 | 2.24 | 114 | 21 | 5.4 | 1.8 | 9.9 | 46 | 41 | 30 | 55 | 4.6 | 8 | >10¹³ |
| | 80 | 20 | CaC₂ | 0.7 | 2.32 | 153 | 16 | 9.6 | 2.7 | 9.4 | 87 | 49 | 35 | 60 | 5.8 | 10 | >10¹³ |
| | 75 | 25 | CaC₂ | 0.8 | 2.42 | 247 | 20 | 12.4 | 3.2 | 8.6 | 106 | 51 | 40 | 65 | 6.5 | 30 | >10¹³ |
| | 75 | 25 | CaC₂ | 1.0 | 2.42 | 155 | 21 | 7.4 | 3.3 | 8.5 | 108 | 53 | 40 | 65 | — | — | — |
| | 60 | 40 | CaC₂ | 1.1 | 2.54 | 235 | 22 | 10.7 | 3.4 | 7.1 | 127 | 66 | 50 | 75 | — | — | — |
| | 50 | 50 | CaC₂ | 1.0 | 2.62 | 155 | 17 | 9.1 | — | — | — | — | — | — | — | — | — |
| | 50 | 50 | CaC₂ | 1.1 | 2.62 | 189 | 19 | 9.9 | — | — | — | — | — | — | — | — | — |
| | 50 | 50 | CaC₂ | 1.2 | 2.62 | 218 | 20 | 10.9 | 3.6 | 6.7 | 139 | 75 | 60 | 85 | 7.2 | 10 | >10¹³ |
| | 50 | 50 | CaC₂ | 1.3 | 2.63 | 258 | 19 | 13.6 | 3.5 | 6.6 | 142 | 74 | 60 | 85 | — | — | — |
| | 50 | 50 | CaC₂ | 1.4 | 2.63 | 209 | 20 | 10.5 | — | — | — | — | — | — | — | — | — |
| | 50 | 50 | CaC₂ | 1.6 | 2.63 | 167 | 18 | 9.3 | — | — | — | — | — | — | — | — | — |
| | 40 | 60 | CaC₂ | 1.4 | 2.72 | 211 | 36 | 5.9 | 3.8 | 5.1 | 178 | 93 | 110 | 140 | — | — | — |
| | 30 | 70 | CaC₂ | 1.5 | 2.85 | 188 | 49 | 3.8 | 4.2 | 4.1 | 218 | 108 | 220 | 230 | 7.5 | 10 | >10¹³ |
| | 20 | 80 | CaC₂ | 1.6 | 2.97 | 162 | 77 | 2.1 | 4.3 | 4.3 | 251 | 126 | 430 | 440 | — | — | — |
| Ex. 6 | 80 | 20 | Y₂O₃ | 1.3 | 2.45 | 159 | 17 | 9.4 | 2.7 | 9.5 | 94 | 51 | 40 | 65 | — | — | — |
| | 75 | 25 | Y₂O₃ | 1.5 | 2.46 | 251 | 21 | 12.0 | 3.3 | 8.5 | 117 | 55 | 45 | 70 | — | — | — |
| | 50 | 50 | Y₂O₃ | 2.0 | 2.68 | 255 | 18 | 14.2 | 3.5 | 6.7 | 151 | 82 | 65 | 95 | — | — | — |
| | 20 | 80 | Y₂O₃ | 3.0 | 2.99 | 166 | 80 | 2.1 | 4.3 | 4.3 | 263 | 141 | 480 | 480 | — | — | — |

Note:
"to HP axis" indicates the value in the direction perpendicular to the compression axis of the hot press, and "to HP Axis" indicates the value in the direction parallel to the compression axis of the hot press.

What is claimed is:

1. A ceramic sintered body consisting essentially of hexagonal boron nitride (h-BN), aluminum nitride (AlN) and unavoidably formed aluminum oxynitride (AlON) if any, and a sintering aid and/or a reaction product of the sintering aid with said h-BN, AlN and AlON, the total amount of the sintering aid and the reaction product being 0.01 to 5 parts by weight per 100 parts by weight of the sum of h-BN, AlN, and AlON, wherein the sintered body comprises AlN and AlON in a total amount of 5 to 80% by weight with 20 to 95% by weight of h-BN having an average grain size of at least 1 μm, a degree of anisotropy of the thermal conductivity of the sintered body being at least 2, and wherein the direction of the maximum thermal conductivity is perpendicular to the direction of the minimum thermal conductivity.

2. A ceramic sintered body set forth in claim 1, wherein the sintered body comprises AlN and, if any, AlON in a total amount of 80 to 20% by weight with 20 to 80% by weight of h-BN, the degree of anisotropy of the thermal conductivity of the sintered body is at least 2, and, the sintered body has a maximum thermal conductivity of at least 150 W/m.K in at least one direction.

3. A ceramic composite as set forth in claim 2, wherein the sintered body comprises AlN and, if any, AlON in a total amount of 75 to 50% by weight with 25 to 50% by weight of h-BN.

4. A ceramic composite as set forth in claim 2, wherein the sintered body comprises AlN and, if any, AlON in a total amount of 50 to 25% by weight with 50 to 75% by weight of h-BN.

5. A ceramic composite as set forth in claim 1, wherein the grain size of h-BN is 5 μm to 30 μm.

6. A ceramic composite as set forth in claim 2, wherein the sintering aid and the reaction product of the sintering aid are present in a total amount of 0.2 to 5.0 parts by weight per 100 parts by weight of the sum of h-BN, AlN, and, if any, AlON.

7. A ceramic sintered body consisting essentially of hexagonal boron nitride (h-BN), aluminum nitride (AlN) and unavoidably formed aluminum oxynitride (AlON) if any, and a sintering aid and/or a reaction product of the sintering aid with said h-BN, AlN and AlON, the total amount of the sintering aid and the reaction product being 0.01 to 5 parts by weight per 100 parts by weight of the sum of h-BN, AlN, and AlON, wherein the sintered body comprises AlN and AlON in a total amount of 5 to 45% by weight with 55 to 95% by weight of h-BN.

8. A ceramic composite as set forth in claim 7, wherein the sintering aid is at least one compound selected from the group consisting of calcium compounds and yttrium compounds.

9. A ceramic composite as set forth in claim 7, wherein the reaction product of the sintering aid with the h-BN, AlN and AlON components is composed mainly of a compound selected from the group consisting of calcium aluminates and yttrium aluminates.

10. A ceramic sintered body as set forth in claim 7, wherein the sintered body has a maximum thermal conductivity at room temperature of at least 40 W/m.K, an average thermal expansion coefficient in a range of from 0° to 400° C. of 1.0 to 4.0×10$^{-6}$/K, a dielectric constant at room temperature and 1 MHz of smaller than 7.5, a porosity of lower than 15% and a flexural strength at room temperature of at least 40 MPa.

11. A ceramic composite as set forth in claim 10, wherein the sintering aid and the reaction product of the sintering aid with H-BN, AlN and AlON components are present in a total amount of 0.2 to 5.0 parts by weight per 100 parts by weight of the sum of h-BN, AlN, and AlON.

12. A ceramic sintered body as set in claim 7, wherein the sintered body comprises a total amount of 40% by weight to 10% by weight of AlN and, if present, AlON, and 60% by weight to 90% by weight of h-BN.

13. A process for the preparation of a ceramic composite, which comprises adding a sintering aid in an amount of up to 10 parts by weight to 100 parts by weight of a powder comprising 55 to 95 parts by weight of a powder of hexagonal boron nitride (h-BN) and 5 to 45 parts by weight of a powder of aluminum nitride (AlN), and heating under pressure the resultant mixture in an inert gas flow under conditions of 1500° to 2000° C. and 5 to 100 MPa.

14. A process according to claim 13, wherein a compounds selected from the group consisting of calcium compounds and yttrium compounds is used as the sintering aid in an amount of up to 5 parts by weight per 100 parts by weight of the sum of h-BN and AlN.

15. A process according to claim 14, wherein a compound selected from the group consisting of calcium compounds and yttrium compounds is used as the sintering aid in an amount of 0.2 to 5.0 parts by weight per 100 parts by weight of the sum of h-BN and AlN.

16. A process according to claim 14, wherein anhydrous boron oxide is further added as the sintering aid in an amount of 0.1 to 5 parts by weight.

17. A process according to claim 14, wherein the calcium compound is selected from the group consisting of calcium oxide, calcium carbide, calcium carbonate, calcium nitrate, calcium fluoride, calcium hydroxide, calcium cyanide and calcium cyanamide.

18. A process according to claim 14, wherein the yttrium compound is selected from the group consisting of yttrium oxide, yttrium carbide, yttrium fluoride and yttrium nitrate.

19. A process according to claim 13, wherein the inert gas flow is a nitrogen gas flow.

20. A process according to claim 13, wherein the sintered body formed by the heating under pressure is further heat-treated at a temperature of 1300° to 1500° C. in a reducing atmosphere or in an inert gas flow.

21. A process according to claim 20, wherein the heat treatment is carried out at 1300° to 1500° C. for 0.5 to 2 hours.

22. A process according to claim 13, wherein the sintered body formed by the heating under pressure is further heat-treated at a temperature of 1800° to 2000° C. for at least 2 hours.

23. A process according to claim 13, wherein the sintered body formed by the heating under pressure is further heat-treated at a temperature of 1800° to 2000° C. in a reducing atmosphere or in an inert gas flow.

24. A process for the preparation of a ceramic sintered body, which comprises adding a sintering aid in an amount of up to 10 parts by weight to 100 parts by weight of a powder comprising 60–90 parts by weight of a powder of hexagonal boron nitride (h-BN) and 40–10 parts by weight of a powder of aluminum nitride (AlN), and heating under pressure the resultant mixture in an inert gas flow under conditions of 1500° to 2000° C. and 5 to 100 MPa.

* * * * *